United States Patent [19]
Gezari

[11] 3,963,040
[45] June 15, 1976

[54] WASTE DISPOSAL SYSTEM

[75] Inventor: Walter A. Gezari, Killingworth, Conn.

[73] Assignee: International Telephone and Telegraph Corporation, New York, N.Y.

[22] Filed: Nov. 25, 1974

[21] Appl. No.: 526,965

Related U.S. Application Data

[62] Division of Ser. No. 315,410, Dec. 15, 1972, Pat. No. 3,870,084.

[52] U.S. Cl. .................... 137/344; 4/10; 4/90
[51] Int. Cl.² ........................ B60N 3/00
[58] Field of Search ............ 137/344; 4/1, 10, 90, 4/115, 11

[56] References Cited
UNITED STATES PATENTS

| | | | |
|---|---|---|---|
| 2,817,846 | 12/1957 | Stift | 4/11 X |
| 3,044,077 | 7/1962 | Belden | 4/10 |
| 3,811,462 | 5/1974 | Feliz | 137/344 |

*Primary Examiner*—Henry T. Klinksiek
*Attorney, Agent, or Firm*—Thomas L. Peterson

[57] ABSTRACT

A waste disposal system for a boat equipped with a head and a waste-holding tank for receiving sewage therefrom. A dual deck fitting and associated equipment permits conventional dockside pumpout of the holding tank and also permits overboard dump of the contents of the tank. The dual deck fitting is provided with a pair of plugs, one of which embodies a pivotable handle which facilitates threading and unthreading of the plug in the deck fitting and also a lug which engages a slot in the other plug to facilitate threading and unthreading of the latter plug in the deck fitting.

7 Claims, 4 Drawing Figures

U.S. Patent   June 15, 1976   3,963,040
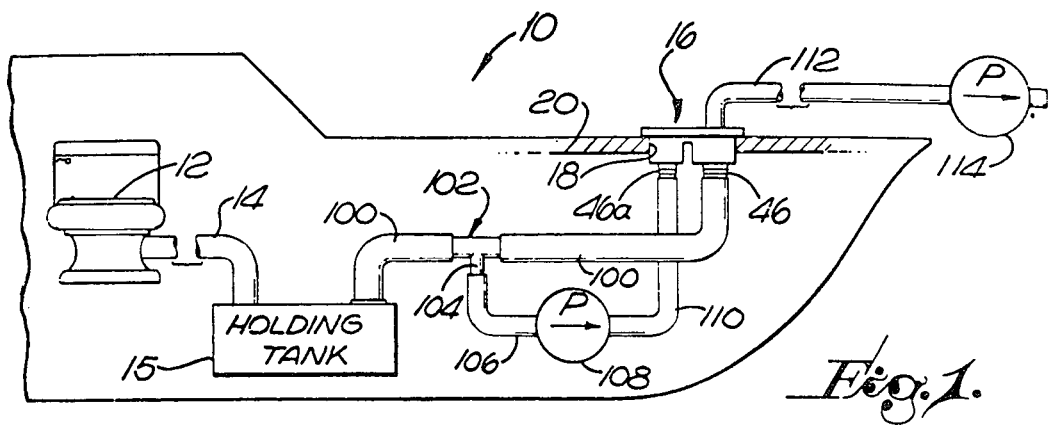
*Fig. 1.*
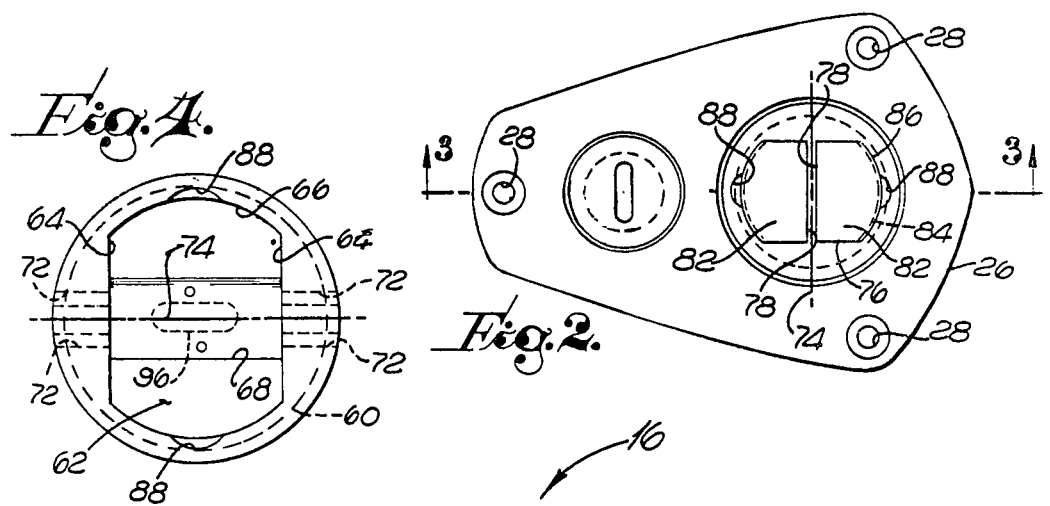
*Fig. 4.*   *Fig. 2.*
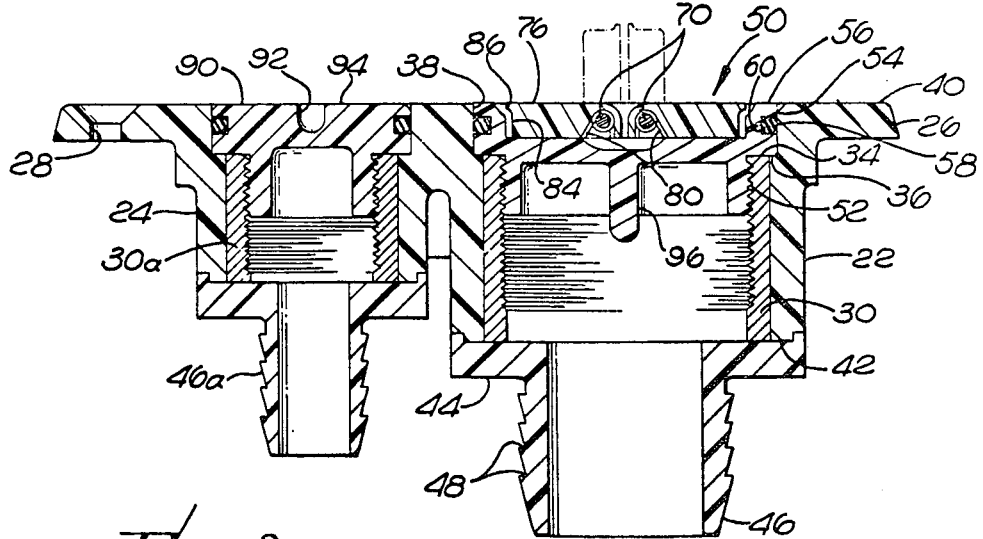
*Fig. 3.*

WASTE DISPOSAL SYSTEM

This is a division of application Ser. No. 315,410, filed Dec. 15, 1972, now U.S. Pat. No. 3,870,084.

BACKGROUND OF THE INVENTION

1. FIELD OF THE INVENTION

This invention relates generally to a waste disposal system for boats and, more particularly, to a novel waste disposal system which permits both conventional dockside pumpout of a waste holding tank and overboard dump of the contents of the tank.

2. DESCRIPTION OF THE PRIOR ART

Recently, laws have been promulgated which prohibit the discharge of sewage and other waste materials through the hull of a vessel inside the 12-mile limit from shore. Pursuant to these laws, vessels may not be provided with a conduit or fitting in the hull which connects to a waste holding tank. Present vessels do, however, have a deck fitting which permits communication with the holding tank whereby the tank may be pumped out when the vessel is in port. Present deck fittings and associated equipment cannot be converted to an overboard dump when the vessel is outside the 12-mile limit. Thus, what is desired and constitutes the principal object of the present invention is a waste disposal system which permits conventional dockside pumpout of a holding tank as well as overboard dump of the contents of the tank.

SUMMARY OF THE INVENTION

According to the principal aspect of the present invention, there is provided a waste disposal system for a boat having a head and a waste-holding tank for receiving sewage from the head. The system includes a dual deck fitting which is mounted in an aperture in the boat deck. The fitting is formed with two pairs of inlet and outlet ports, one pair being larger than the second pair. A conduit connects the waste holding tank to the larger inlet port. The inlet of an onboard pump is connected to a T-fitting in the first conduit and the outlet of the pump is connected to the smaller inlet port of the dual deck fitting. Plugs are mounted in the outlet ports of the deck fitting to close the same. When conventional dockside pumpout of the holding tank is desired, the larger plug in the dual deck fitting is removed and a conduit is connected between the larger outlet port and a dockside pump for removing sewage from the holding tank. When it is desired to dump the contents of the tank overboard at sea, the smaller diameter plug is removed from the fitting, a hose is connected in place of such plug, and the onboard pump is energized.

According to another aspect of the present invention, the larger plug of the above-described deck fitting is provided with a pivotable handle which is adapted to be raised from a normal horizontal position to a vertical position to facilitate threading and unthreading of the plug in its respective outlet port. The plug is also provided with a lug which is engageable in a slot in the upper surface of the smaller plug to facilitate the threading and unthreading of the smaller plug in its outlet port. Thus, no special tools are required for removing the plugs from the deck fitting.

BRIEF DESCRIPTION OF THE DRAWINGS

FIG. 1 is a schematic illustration of a boat equipped with a waste disposal system according to the invention;

FIG. 2 is a top plan view of the dual deck fitting utilized in the waste disposal system of the invention;

FIG. 3 is a vertical sectional view taken along line 3—3 of FIG. 2; and

FIG. 4 is a top plan view of the larger plug of the deck fitting with the pivoted handles removed therefrom.

DESCRIPTION OF THE PREFERRED EMBODIMENT

Referring now to the drawing in detail, there is illustrated in FIG. 1 a pleasure boat, generally designated 10, which may be of any suitable type and is here illustrated as being a cabin cruiser. The boat is provided with a head or toilet 12 which is connected through a conduit 14 to a waste holding tank 15. A dual deck fitting 16 is mounted through an aperture 18 in the boat deck 20.

As best seen in FIG. 3, the deck fitting 16 is a molded plastic body having large and small diameter downwardly depending cylindrical sections 22 and 24, respectively, and a peripheral flange 26. As seen in FIG. 2, the flange is provided with three apertures 28 through which screws, not shown, pass for mounting the fitting 16 on the boat deck. An internally threaded metallic insert 30 is mounted within the bore 32 of the larger cylindrical section 22. The insert is molded in place when the body of the deck fitting 16 is formed. The upper end 34 of the insert is coplanar with the bottom 36 of a recess 38 formed in the upper surface 40 of the fitting. The bottom of the insert 30 is coplanar with the bottom 42 of the cylindrical section 22 of the fitting body. A plastic hose-coupling member 44 is fixed to the bottom 42 of the body section 22 by ultrasonic welding or the like. The coupling member 44 embodies a downwardly depending neck 46 which is formed on its outer surface with annular barbs 48 for retaining a flexible hose (not shown in FIG. 3) which is forced onto the neck.

The smaller diameter section 24 of the fitting 10 is provided with a metallic insert and a hose coupling member, as well as other constructional features which are identical in all respects to that provided for in the cylindrical section 22 of the fitting except that in the section 24, the various parts and openings are of smaller diameter. When reference is made hereinafter in this specification to the various parts of the cylindrical section 24 of the fitting, the same reference numerals employed in connection with the parts in the cylindrical section 22 will be used with the identifying suffix "a" added.

A plug 50 is mounted in the large diameter section 22 of the fitting. The plug comprises a cylindrical body portion 52 which is externally threaded to engage the internally threaded insert 30. An outwardly extending flange 54 is formed on the plug which rests on the upper surface of the insert 30 when the plug is fully threaded into the insert. At this instance, the upper surface 56 of the plug will be flush or coplanar with top surface 40 for the fitting. An O-ring 58 mounted in an annular groove 60 at the outer surface of the flange 54 provides a seal between the upper portion of the plug and the cylindrical wall of the recess 38. This seal is effective upon initial threading of the plug into the fitting so that a seal is provided even though the plug is not fully tightened down into the fitting.

As best seen in FIG. 4, an elongated recess 62 is formed in the upper surface of the plug 50. This recess includes a pair of parallel flat sides 64 and circular ends 66. A laterally extending channel 68 formed in the bottom of the recess extends from the opposite flat sides 64 thereof. A pair of pivot pins 70 extend transversely of the elongated recess 62 over the channel 68 and are retained in passages 72 formed in the sides of the plug 50. The pins are positioned relatively close to the transverse center line 74 passing through the center of the plug normal to the sides 64 of the recess. A pair of flat tabs 76 are positioned in the recess 62 in side-by-side relation with their juxtaposed surfaces 78 lying parallel and slightly spaced from the center line 74 of the plug. The tabs are pivotally mounted on the pins 70. Springs 80 carried by the pins 70 urge the tabs to a downward position in the recess 72 wherein the upper surfaces 82 of the tabs are coplanar with the upper surface 40 of the fitting body thereby providing a low profile fitting which will not interfere with movement of personnel on the boat deck.

The opposed ends 84 of the tabs 76 are each formed with an upper outwardly extending peripheral lip 86. Depressions 88 are formed in the upper surface plug 50 adjacent the circular ends 66 of the recess 62. Thus, a user may insert his finger into the depressions to engage under the lips 86 and lift the tabs 82 to a vertical position, as shown in phantom lines in FIG. 3. In this position, the tabs provide a handle for rotating the plug in the fitting 16.

A small plug 90 is threaded in the metal insert 30a in the small diameter section 24 of the fitting. The outer configuration of this plug is similar to the plug 50. An elongated slot 92 is formed in the upper surface 94 of the plug 90 which is adapted to receive a complementary shaped lug 96 which is formed on the bottom of the plug 50. Thus, when the plug 50 is removed from the section 22 of the fitting, the lug 96 on the plug may be inserted into the slot 92 of the smaller plug 90 and used as a tool to thread or unthread the latter plug in the smaller cylindrical section 24 of the fitting. It will be further appreciated that the neck 46 and bore 32 of the larger section 22 of the fitting provide a first pair of inlet and outlet ports while the neck 46a and bore 30a in the cylindrical section 24 of the fitting provides a second, but smaller, pair of inlet and outlet ports, the outlet ports of the two sections being normally closed by the plugs 50 and 90, respectively.

Referring again to FIG. 1 of the drawings, it is seen that a conduit 100 connects the holding tank 15 to the inlet port 46 of the fitting 16. A T-fitting 102 is mounted in the conduit 100. The base 104 of the T-fitting is connected by means of a conduit 106 to the inlet of a pump 108. Preferably, the pump 108 is a macerator pump which grinds waste down to small particle size. The outlet of the pump 108 is connected via conduit 110 to the inlet port 46a of the fitting 16.

When it is desired to evacuate the contents of the holding tank 15 to a dockside tank, the plug 50 is removed from the fitting 16 and a hose 112 is connected at one end to the outlet port 30 of the fitting, and the other end of the hose is connected to a dockside pump 114. Energization of the pump 114 will remove waste from the holding tank 16 to the dockside tank, not shown.

When it is desired to dump the contents of the holding tank 15 overboard at sea, the plug 50 is removed from the fitting 16 and used as a tool to remove the smaller plug 90. Thereafter, the larger plug 50 is replaced in the fitting and a hose, not shown, is connected in place of the smaller diameter plug 90. The pump 108 is then energized to withdraw the contents of the holding tank 15 through the conduits 106 and 110 outwardly through the hose which extends overboard.

Thus, it is seen by the present invention there is provided a novel deck fitting and associated equipment which permits conventional dockside pumpout of a holding tank and also permits overboard dumping of the contents at sea and does not require any special tools for removing the plugs from the deck fitting.

Although I have herein shown and described my invention in what I have conceived to be the most practical and preferred embodiment, it is recognized that departures may be made therefrom within the scope of my invention which is not to be limited to the details disclosed herein but is to be recorded the full scope of the claims so as to embrace any and all equivalents, structures and systems.

What is claimed is:

1. A waste disposal system for a boat having a deck and a waste holding tank therebelow comprising:
   a dual deck fitting adapted to be mounted in an aperture in the boat deck;
   said fitting being formed with first and second pairs of inlet and outlet ports;
   pump means for mounting in said boat;
   a first conduit having one end connected to the inlet port of said first pair and the other end adapted to be connected to said holding tank;
   a second conduit having one end connected to the inlet port of said second pair and the other end connected to the outlet of said pump means; and
   a third conduit having one end for flow communication with said tank and the other end connected to the inlet of said pump means.

2. A system as set forth in claim 1 wherein:
   said deck fitting includes first and second plugs threaded into said outlet ports;
   a pivotable handle means on said first plug adapted to be raised from a normal horizontal position to a vertical position to facilitate threading and unthreading of said plug in its respective outlet port;
   a slot in one of said plugs; and
   a lug on the other plug engageable in said slot to facilitate threading and unthreading of said second plug in its respective outlet port.

3. A system as set forth in claim 2 wherein:
   said handle means comprises a pair of generally flat tabs mounted in a recess in the upper surface of said first plug in side-by-side relation; and
   means mounting said tabs for pivotable movement about generally horizontally extending axes parallel and adjacent to the juxtaposed sides of said tabs.

4. A system as set forth in claim 3 including:
   spring means urging said tabs to said normal horizontal position.

5. A system as set forth in claim 2 wherein:
   said lug is formed on the bottom of said first and said slot is formed in the upper surface of said second plug.

6. A system as set forth in claim 1 wherein:
   said deck fitting includes a plug threaded into each of said outlet ports; and one of said plugs being formed with tool means engageable with the other plug to facilitate threading and unthreading of said other plug in its respective outlet port.

7. A waste disposal system for a boat having a deck with a toilet therebelow comprising:
 a closed waste holding tank adapted to be positioned below said deck and adapted to be connected to said toilet;
 a pair of ports adapted to be mounted on the exterior of said boat;
 first means providing flow communication between said tank and one of said ports;
 second means providing flow communication between said tank and the other port;
 pump means in said first flow communication means for transferring sewage from said tank to said one port;
 plugs mounted in said ports for closing the same; and
 said ports embodying coupling means for connecting hoses thereto, when said plugs are removed therefrom, for conveying sewage overboard and to a dockside pump, respectively.

* * * * *